No. 816,153. PATENTED MAR. 27, 1906.
J. W. DALRYMPLE.
CLOD CRUSHER.
APPLICATION FILED OCT. 14, 1905.
2 SHEETS—SHEET 2.
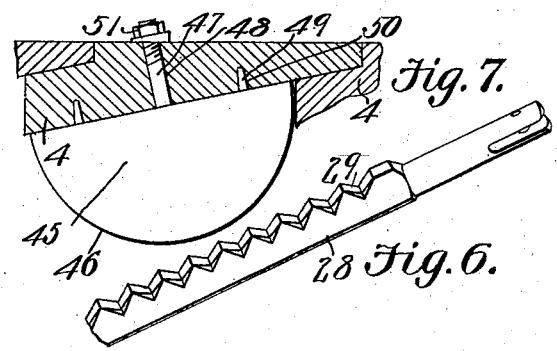
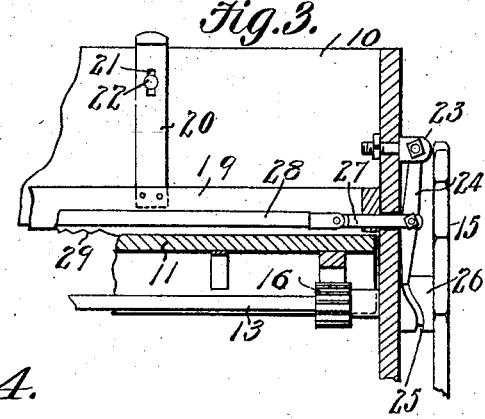
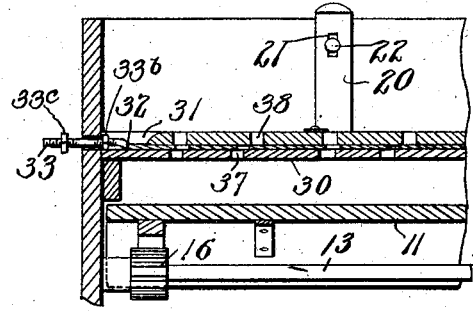
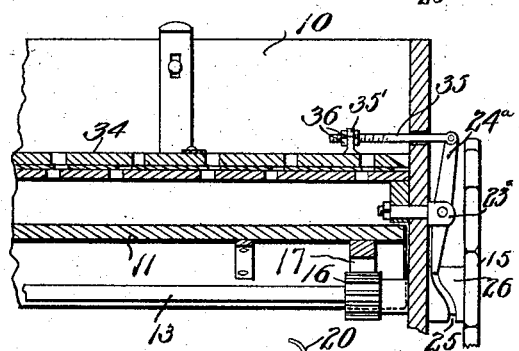
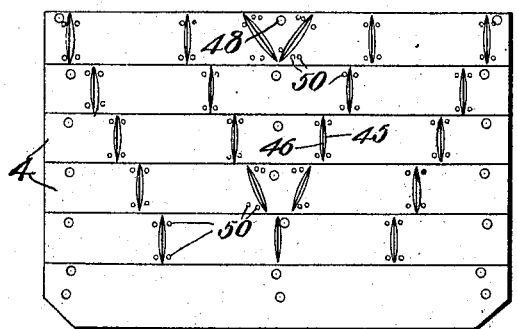
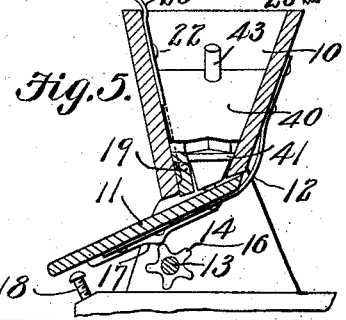
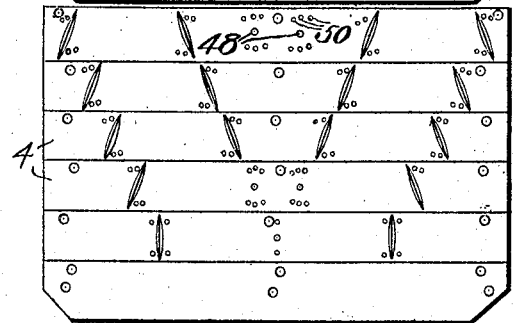
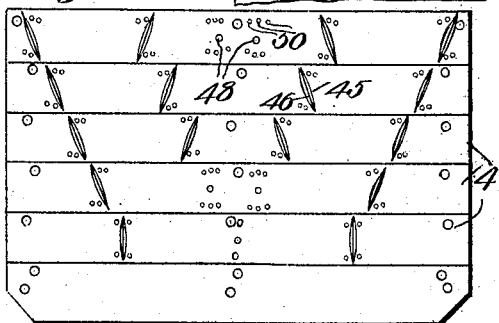
Witnesses
James W. Dalrymple, Inventor.
by C. A. Snow & Co.
Attorneys

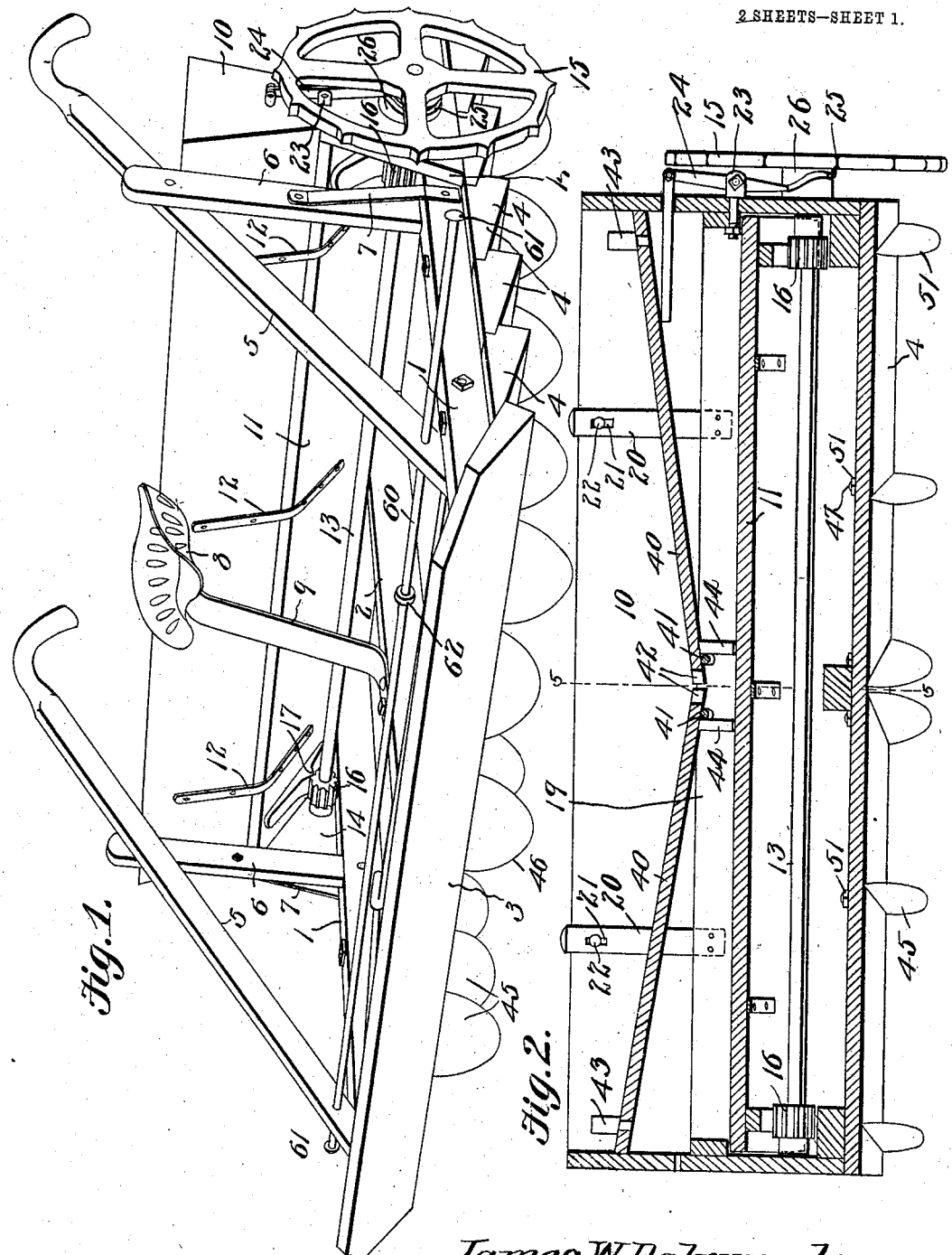

UNITED STATES PATENT OFFICE.

JAMES W. DALRYMPLE, OF SOLSBERRY, INDIANA.

CLOD-CRUSHER.

No. 816,153.  Specification of Letters Patent.  Patented March 27, 1906.

Application filed October 14, 1905. Serial No. 282,801.

*To all whom it may concern:*

Be it known that I, JAMES W. DALRYMPLE, a citizen of the United States, residing at Solsberry, in the county of Green and State of Indiana, have invented a new and useful Clod-Crusher, of which the following is a specification.

This invention relates to that class of agricultural implements which are used for the purpose of pulverizing and leveling the soil by cutting and crushing the clods and for depositing seed and fertilizing material, the objects of the invention being to simplify and improve the construction and operation of this class of implements.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be resorted to when desired.

In the drawings, Figure 1 is a perspective view of a machine constructed in accordance with the principles of the invention. Fig. 2 is a vertical sectional view taken through the hopper and illustrating attachments within the hopper whereby fertilizing material may be dropped in a single row or furrow. Fig. 3 is a sectional detail view of the hopper, showing the latter equipped with agitating means for broadcasting fertilizing material. Fig. 4 is a vertical sectional view taken through the hopper and showing the latter adapted for broadcasting seed. Fig. 5 is a sectional detail view taken on the plane indicated by the line 5 5 in Fig. 2. Fig. 6 is a perspective detail view of a portion of the agitating device for broadcasting fertilizing material. Fig. 7 is a detail view showing in side elevation one of the clod-cutting and soil-moving disks and also showing in section a portion of the machine with which said disk is connected. Figs. 8, 9, and 10 are detail bottom plan views of a machine, illustrating different arrangements of the earth-engaging disks or cutters.

Corresponding parts in the several figures are indicated throughout by similar characters of reference.

The frame of the machine includes a plurality of longitudinal bars 1 1 and 2, the former being the side members and the latter an intermediate longitudinal member. These longitudinal bars are connected at their front ends by an inclined guard-plate 3. Secured upon the under sides of the longitudinal members 1 and 2 are transversely-disposed planks 4 4, which may be overlapped after the manner of weather-boarding and the under surfaces of which are downwardly and rearwardly inclined. Handles 5 5 are provided, the lower ends of which may be secured near the front ends of the side bars 1 and the upper ends of which may be supported by uprights 6, reinforced by braces 7. A seat 8 for the driver or operator is also provided, said seat being supported by the resilient seat-bar 9, secured upon the central longitudinal bar 2.

Upon the frame or bed structure, which includes the members 1, 2, and 4, is supported a hopper 10, the ends of which have been shown as supported upon the extremities of the planks 4, which extend beyond the side members 1 1 near the rear ends of the latter. The bottom of the hopper is formed by a board 11, supported for vibration by means of resilient straps 12, the forward and upward extremities of which are secured upon the front side of the hopper. A shaft 13, extending beneath the hopper transversely across the bed of the machine, is supported for rotation in the downwardly-extended end pieces 14 of the hopper, and said shaft carries at one end a ground-engaging wheel 15, whereby it is rotated when the machine passes over the ground. Said shaft also carries corrugated wheels 16, engaging projections 17 upon the under side of the vibratory bottom board 11, to which motion is thus imparted. The downward movement of the free end of the bottom board is regulated by means of set-screws, as 18, which engage the frame-bars 1 near the rear ends of the latter, one such screw being shown in Fig. 5 of the drawings.

Interiorly upon the hopper on the rear side of the latter, is adjustably supported a gate 19, the position of which determines the extreme limit of the upward movement of the vibratory bottom board, said gate being supported by means of straps 20, having slots 21, through which extend fastening members, such as set-screws 22. The vibratory bottom board 11, as will be seen in Fig. 5 of the drawings, overhangs the rear end of the frame, so that material will be conveyed from the hopper over said bottom board to the ground in rear of the machine, as will be readily understood.

One of the end members of the hopper has a lug 23, upon which is pivoted a lever 24, the point of which engages a cam-groove 25 in a disk 26, mounted upon the shaft 13, so that when the shaft is rotated the lever will be vibrated. In Fig. 3 of the drawings the lever 24 has been shown as connected by a link 27 with one end of a reciprocatory rod or member 28, supported upon the bottom of the seedbox and having teeth or serrations 29, that face the aperture between the rear wall of the hopper and the vibratory bottom. This instrumentality is mainly used when fertilizing material that is more or less damp is to be distributed.

In Fig. 4 of the drawings the hopper has been shown equipped with a false bottom 30, having a groove 31, in which is supported a regulating-slide 32, having a handle 33 extending through one end of the hopper. The handle 33 is threaded, as shown, and it is provided adjacent to the inner side of the end member of the hopper with an adjusting-nut 33$^b$ and adjacent to the outer side of the end member of the hopper with a thumb-nut 33$^c$. In the groove 31, above the slide 32, is supported a seed-slide 34, having a lug 35', which is connected by a rod 35 with a lever (here designated 24$^a$) which is pivoted upon a lug 23$^a$ upon the end of the hopper. The inner end of the rod 35 is preferably screw-threaded for the reception of nuts 36, whereby it is connected with the lug 35' in order that it may be conveniently detached when it shall be desired to remove the false bottom 30. The latter is provided with apertures 37 for the passage of seeds, and the slide 34 is provided with corresponding seed cups or apertures 38. The intermediate slide 32 is also provided with corresponding openings, which may be placed in alinement or partly in alinement with the apertures 37 for the purpose of partly obstructing the latter when desired, so as to regulate the passage of seed. The thumb-nut 33$^c$ will be preferably so adjusted that when it engages the end of the hopper the slide 32 will obstruct the apertures 37, thus enabling the slide to be readily removed to an obstructing position when, for instance, it is desired to move the machine from one place to another without planting. The adjusting-nut 33$^b$ will be set or adjusted to enable the slide to be moved precisely the desired distance to reset said slide for planting purposes. This false bottom, with its related parts, may be utilized for planting coarse or fine seeds, as well as fertilizing material or a mixture of seed and fertilizing material when sufficiently dry and fine to permit it to be operated upon by the seed-slide.

Under some circumstances it will be desirable to deposit fertilizing material in a single row or in a furrow previously prepared for the reception thereof. In order to enable the material to be thus deposited, a pair of wedge-shaped boards 40 are provided, said boards being of such size and shape that when placed in the hopper in position for operation, as shown in Figs. 2 and 5, they will fit between the front and rear side walls, which are upwardly divergent and occupy positions inclining downwardly toward the center of the hopper, where the lower inner ends of said boards rest lightly upon a pair of transverse pins 41. The inner adjacent ends of the boards are provided with notches 42 for the escape of the fertilizing material, which is supported upon these inclined boards, which temporarily constitute the bottom of the hopper and which are provided near their upper outer ends with handles 43, whereby they may be readily manipulated to place them in position or to remove them, as may be required. Said boards are provided near their inner ends with downward-extending lugs 44, that rest upon the vibratory bottom plate 11, so that when the machine is drawn over the ground the boards 40 will be vibrated, the fertilizing material will escape through the notches 42 onto the vibratory board 11, and said material will escape over the bottom board 11 onto the ground or into a furrow previously prepared for its reception.

It is to be understood that when used with or without any of the various attachments herein described the planting and distributing device may be used for the purpose of depositing any kinds of seeds and any of the various commercial fertilizers or similar materials that it may be desired to deposit upon the ground prepared for its reception.

In connection with the frame of the machine herein described there is used a plurality of cutters or soil-engaging elements 45, consisting of disks made preferably of steel in approximately semicircular shape, the curved edges of said disks 46 being sharp. The straight edges of these disks are provided with shanks 47, extending through apertures 48 in the bottom planks 4 of the device, said straight edges being also provided with lugs 49, adapted to engage recesses 50 in the under side of said planks to secure the disks against rotative movement upon the shanks 47, which latter are threaded and provided with fastening devices, such as nuts 51. The apertures for the reception of the shanks of these earth-engaging members are arranged in pluralities of parallel rows, so that said disks may be arranged in rows diverging rearwardly from the front of the machine. Adjacent to each of the shank-receiving apertures 48 is formed a plurality of lug-receiving apertures 50, which latter are disposed concentrically around the shank-receiving apertures 48, thus enabling the earth-engaging disks to be adjusted parallel to the line of progress of the machine or at various angles to said line, as may be preferred.

In Figs. 8, 9, and 10 have been shown various examples of the different adjustments of the earth-engaging disks, which when set parallel to the line of progress will serve principally to cut any clods with which they may come in contact and prepare the same to be readily crushed by the action of the inclined planks 4. When set at various angles, the disks may be caused to operate to move the soil or portions of the soil either in an outward or an inward direction or first in an outward and then in an inward direction, or vice versa. By this means the soil may be not only crushed and pulverized, but also stirred and agitated for the extermination of weeds and noxious growths, which by the cutting action of the disks will be thoroughly destroyed and exterminated. Furthermore, by arranging the cutting-disks substantially as shown in Fig. 8 of the drawings, in which a pair of disks under the rear plank 4 have been set with their front ends converging and their rear ends spaced apart, a furrow may be prepared for the reception of fertilizing material when it is not desired to scatter the latter broadcast. By dispensing with the disks arranged along the central line of the machine the latter may be used for cultivating purposes upon young corn and other plants growing in rows, the divergent rows of disks being placed or adjusted, as will be seen, to move the soil laterally toward and away from the plants, as will be readily understood by reference to the drawings. When the device is thus employed, the resistance of the soil to the progress of the disks or blades will prevent the machine from sinking deeply into the soil, and the young plants will not be injured thereby.

The handles 5 5 of the machine are provided with bearings for a laterally-slidable rod 60, provided on the ends thereof with buttons, as 61, which may be readily seen by the operator and which are useful in enabling him to guide the machine. This rod is provided with an intermediately-disposed foot-piece 62, whereby it may be readily shifted by the foot of the operator from one side of the machine to the other.

It will be understood that when the improved machine is used for soil-preparing or for cultivating purposes the hopper, with all its related parts, may be removed, so that the machine will not be weighted or encumbered thereby.

In its general construction the improved machine is simple, and the operation is thoroughly effective for the purposes indicated.

An important advantage resulting from the construction and arrangement of the earth-engaging blades herein described resides in the fact that said blades when the exposed portions of the cutting edges become dull from wear may be entirely reversed, thus making the blade self-sharpening.

Having thus described the invention, what is claimed is—

1. An earth-engaging member consisting of an approximately semicircular disk having a sharp curved cutting edge and provided at its straight edge with a radially-extending tang or shank and with lugs whereby it may be secured against rotation.

2. An earth-engaging member having a curved cutting edge and a straight engaging edge provided with a radially-extending securing member and with lugs whereby it may be secured against rotation, in combination with a supporting member apertured for the reception of the securing member and having a plurality of recesses disposed concentrically around said aperture for engagement with the lugs.

3. A supporting member, in combination with an earth-engaging member having an approximately semicircular cutting edge and provided with a straight edge engaging the under surface of the supporting member, a securing member extending from the straight edge through the supporting member, and lugs extending from said straight edge and adjustably engaging recesses in the under surface of the supporting member.

4. In an implement of the class described, a frame including a plurality of transversely-disposed members having downwardly and rearwardly inclined under surfaces, in combination with rows of earth-engaging semicircular blades having straight edges engaging the under surfaces of the transversely-disposed members, pivotal securing means, and means for securing the blades at various adjustments.

5. In an implement of the class described, a frame including a plurality of transversely-disposed members having downwardly and rearwardly inclined under surfaces, in combination with earth-engaging semicircular blades having straight edges engaging the under surfaces of the transversely-disposed members, securing-shanks extending through said members, and lugs adapted for engagement with the recesses in said members to secure the blades at various adjustments.

6. In an implement of the class described, a frame including a plurality of transversely-disposed members having downwardly and rearwardly inclined under surfaces, in combination with earth-engaging approximately semicircular blades having straight edges engaging the under surfaces of the transversely-disposed members, means for pivotally connecting the blades with the supporting members, and means for securing said blades, at various adjustments, against rotation.

In testimony that I claim the foregoing as my own I have hereto affixed my signature in the presence of two witnesses.

JAMES W. DALRYMPLE.

Witnesses:
　N. W. L. CAVIUS,
　FRANK CAVIUS.